No. 895,939. PATENTED AUG. 11, 1908.
R. BAGGALEY.
METHOD OF TREATING ORES.
APPLICATION FILED FEB. 8, 1906.

3 SHEETS—SHEET 2.

WITNESSES
Warren W. Swartz
R. A. Balderson

INVENTOR
Ralph Baggaley
by Bakewell & Byrnes
his attys

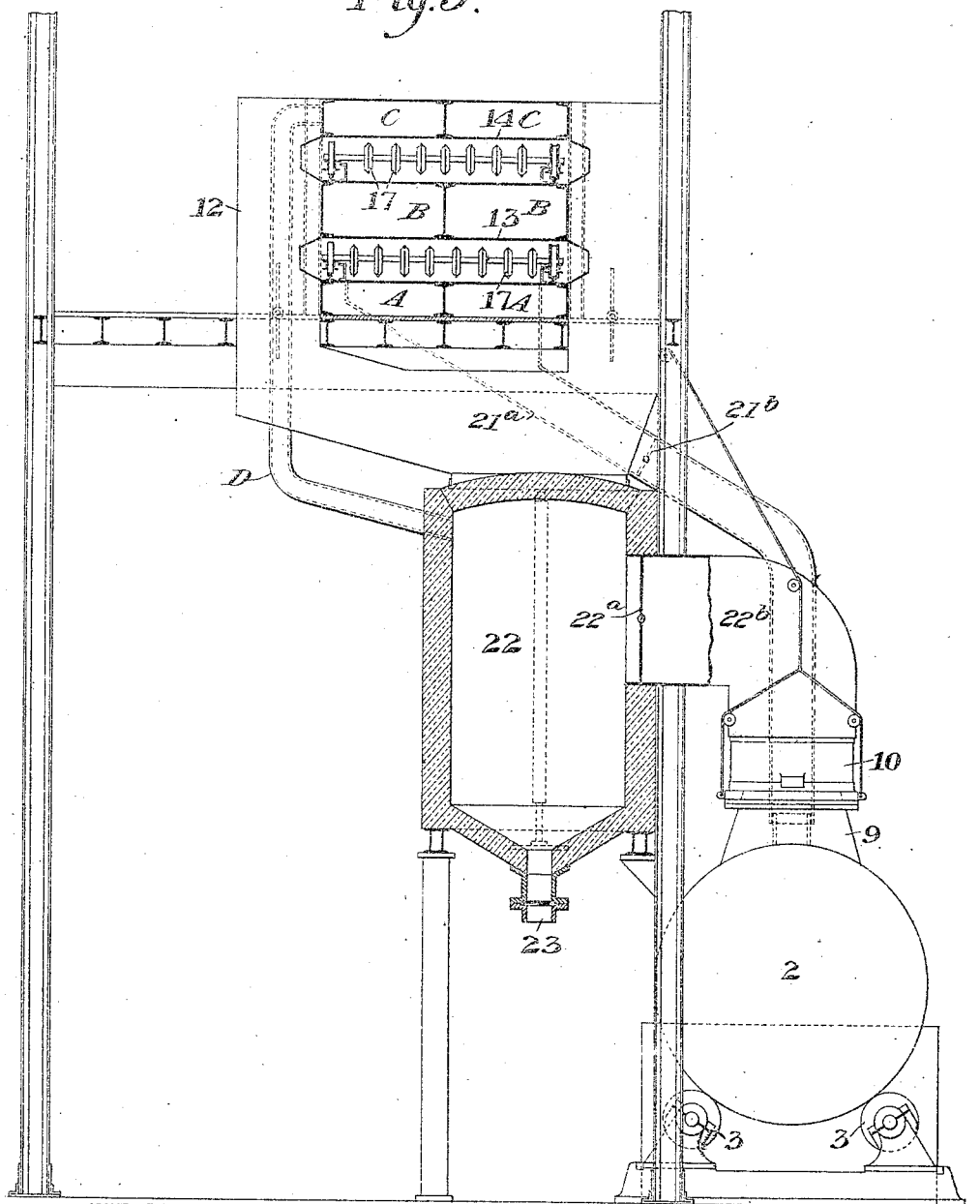

UNITED STATES PATENT OFFICE.

RALPH BAGGALEY, OF PITTSBURG, PENNSYLVANIA.

METHOD OF TREATING ORES.

No. 895,939.

Specification of Letters Patent.

Patented Aug. 11, 1908.

Application filed February 8, 1906. Serial No. 300,072.

*To all whom it may concern:*

Be it known that I, RALPH BAGGALEY, of Pittsburg, Allegheny county, Pennsylvania, have invented a new and useful Method of Treating Ores, of which the following is a full, clear, and exact description, reference being had to the accompanying drawings, forming part of this specification, in which—

Figure 1:
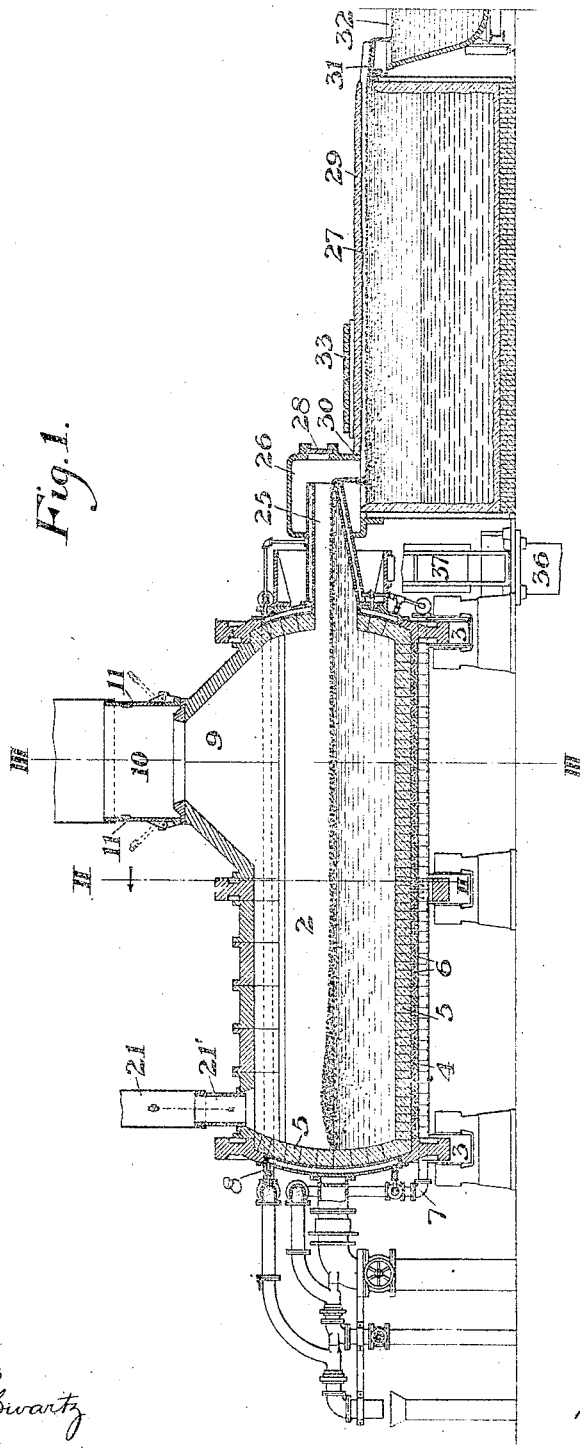
Figure 2:
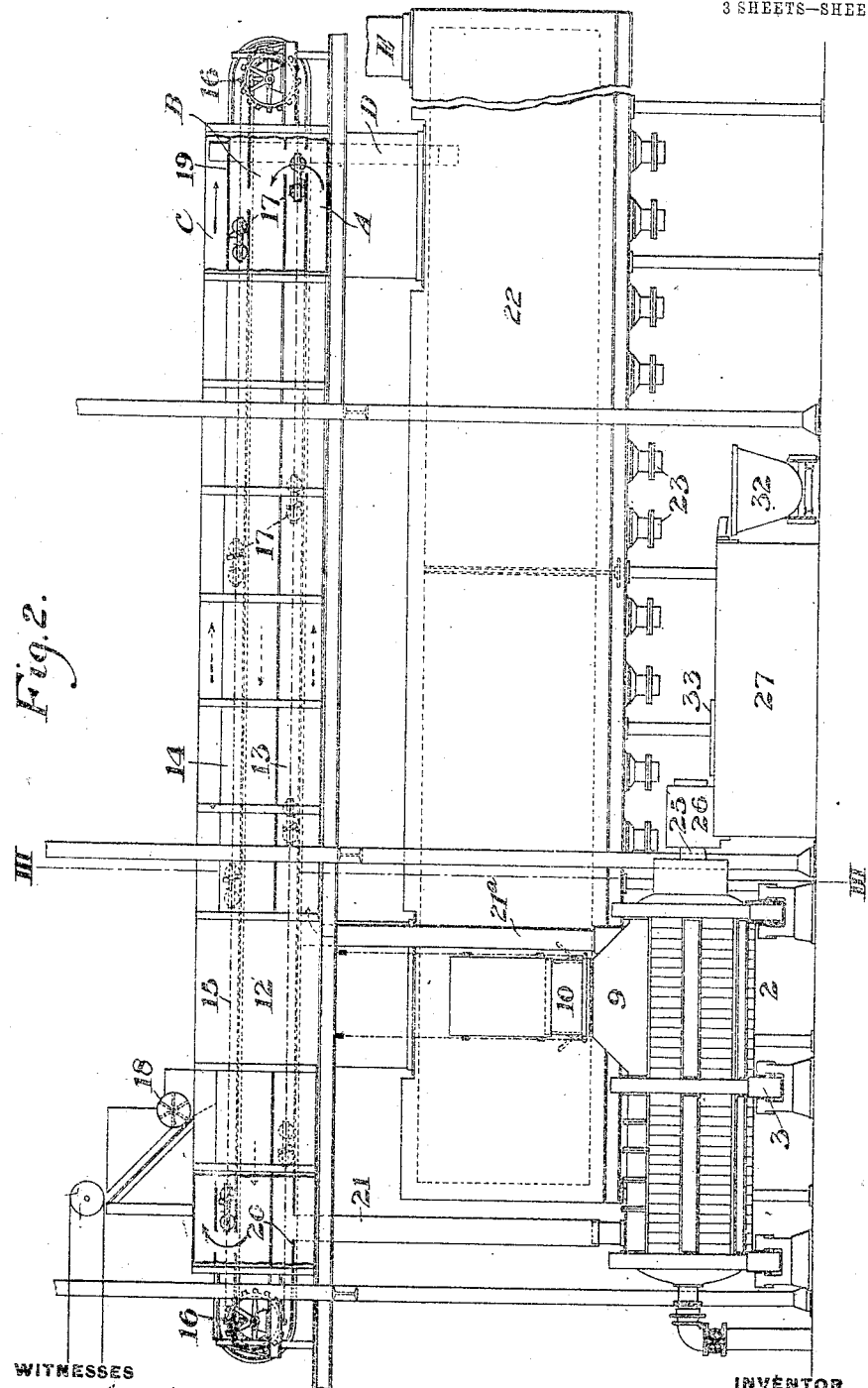

Figure 1 is a longitudinal section of a furnace of the type in connection with which my invention is preferably employed; Fig. 2 is a side view, partly broken away, showing the means for preheating the ore; and Fig. 3 is a cross-section on the line III—III of Fig. 2.

My invention has relation to a novel method for the treatment of ores for the purpose of simultaneously smelting them and extracting values therefrom by liquation or sweating, and without the use of carbonaceous fuel, thus rendering available for commercial use large bodies of low-grade ores that are now worthless.

In the method to which my invention is applicable, a bath of molten matte is first preferably derived from an outside source, although it may be melted within the vessel itself by a simple melting, with the least possible concentration, of ores that are rich in iron, sulfur, and other oxidizable elements or compounds. A converting blast is then driven into the bath of molten matte, which produces heat, and thereafter ores are fed into the apparatus either continuously or intermittently, as may be preferred. If increased heat is desired in the bath, sulfids are fed. If mineral values are desired, these are usually best obtainable from ores of a silicious nature. Care should be taken to provide and maintain a molten bath that contains sufficient iron, sulfur and other oxidizable elements and compounds to constantly supply the heat necessary to produce success. Thereafter silicious ores are fed into the furnace and these are fused to the point where the iron in the matte after oxidation will form silicate slag at minimum temperatures (much less than the temperatures that ordinarily prevail in blast furnace work) and thereafter an excess of silicious ores may be fed onto the molten bath, and these float submerged or partially submerged in matte the entire length of the vessel, subjected to the heat and the agitation produced by a converting blast, so that their mineral contents, usually existing in the form of occluded particles of sulfid, are sweated out, join the molten bath of matte and are recovered, while the liquated, worthless, silicious shells are discharged with slag and matte into the forehearth at a lower level. In the latter vessel the matte-prills are very thoroughly separated from the worthless slag and silicious ore-shells under favorable conditions that guarantee an excellent recovery.

The liquating or sweating out of mineral from various cupreous materials is not a new art in metallurgy, if carbonaceous fuel be solely depended upon, to produce and to maintain the necessary heat. It is, however, radically new and is much more economical to practice the liquation in the apparatus described in my present invention in which heat is generated by oxidation of the molten contents of the vessel or furnace.

My invention contemplates the crushing of the ores to a small size, say to the size of a walnut, and then preheating them to a temperature less than the fusion point of the sulfids and other natural fuel elements contained therein, after which they are delivered to the furnace. This preheating is preferably effected by means of the hot gases from the converter, the heat of which is thus largely utilized, while the ores are delivered to the converter in the best condition for their efficient and economical treatment therein.

My invention is preferably employed in connection with a converter which is rotatably mounted preferably upon rollers or a cradle, and is preferably made of cylindrical form of greater length than diameter. As above stated this furnace is mounted on rollers 3, 3, and has an exterior metal shell 4 and an interior refractory lining 5, the metal shell being preferably provided with water-cooling pipes 6 through which streams of water may be maintained for the purpose of placing a limit upon the extent to which the interior basic lining can be destroyed by the molten contents of the vessel. The water enters the cooling pipes 6 from mains 7, 7 at the lowest point of the converter and passes upwardly therefrom and thence discharges into elevated mains 8, 8, thus preventing the possibility of the formation of steam pockets. The converter 2 is provided with a throat 9 for the escape of gases, and this throat communicates with a telescopic pipe 10 through which the gases pass to a stack. The lower section of the pipe 10 is preferably provided with doors 11 to afford means for removing congealed slag from the interior of the throat 9. During the operation of the converter the lowest section 10 of the telescopic pipe is preferably dropped into position upon the throat 9 as shown in Fig. 1, so as to exclude the air, and thus prevent any cooling influence upon the hot gases of the converter. These gases are thence led to a suitable preheater in which the ore to be charged into the converter may be heated to a point less than the fusion point of sulfid. This preheating has the effect of expelling moisture from the ores, and it also heats them to an important extent, thus materially increasing the smelting capacity of the converter. By checking the preheating at a point less than the fusion point of the sulfids and other fuel elements contained in the ores, these elements are fully preserved to be utilized in the subsequent smelting of the ores. I illustrate such preheater in Figs. 3 and 4 in which 12 represents a hollow chamber into which the gases discharge from the converter. This chamber is of considerable length and contains two sub-chambers 13, 14, one above the other in which the branches of an endless chain extend, this endless chain 15 passing around sprockets 16 and having stirrers 17 for propelling the ore. The ore is introduced into the upper chamber 14 through a feeding device 18 and is carried through such chamber in the direction of the arrow by the endless chain feeders until it comes to a drop 19, where it drops into the lower chamber 13 and is there engaged again by the stirrers on the endless chain, and is carried in the direction of the lower arrow to a second drop 20, at which it drops into the feed tube 21 which leads to the converter. The gases from the converter pass upwardly into the preheating chamber through the pipe or passage 21$^a$, and enter the lower compartments A. They pass longitudinally through the chamber to its forward end portion, whereby they pass upwardly and into the intermediate compartments B; thence back through this compartment and up into the top compartments C; thence again forwardly; and thence downwardly by passage or flue D into a dust chamber 22, and thence out to the stack E. The gases in passing through the compartments A, B and C of the preheater thus surround the chambers 13 and 14, as shown in Fig. 3, through which the ore is passing, and thus heat the ore to a considerable temperature, but short of that at which the sulfids of the ore can be fused. When it is not desired to pass the gases from the converter through the preheater, they can be diverted directly through the dust chamber 22 into the stack flue. This is effected by closing the damper or valve 21$^b$ in the pipe or flue 21$^a$, and opening the damper or valve 22$^a$ in the pipe or flue 22$^b$ which leads directly from the throat of the converter into the dust chamber 22. The flue dust from the dust catcher 22 may be removed from time to time through openings 23 at its base. Shelf or other forms of preheaters may be used if preferred, without departing from the spirit of my invention.

The converter is preferably about 20 feet in length and 8 feet in diameter. At one end, as above stated, it is provided with the pipe 21 through which ore is introduced, and with adjacent opening 24 through which molten matte may be introduced. At the other end of the furnace is the outlet 9 for the gases and an overflow-spout 25 for the escape of the molten matte and the slag and silicious shells. This spout 25 is preferably water-jacketed, as the volume of material that passes through it is very great and it is desirable to water-jacket it in order to prevent injury by reason of the cutting action of the flowing material. 26 is a practically air-tight metal drop-tube through which the molten slag and matte and the silicious shells drop together out of the overflow-spout into the forehearth 27. The drop-tube 26 is provided with an opening 28 through which the overflow-spout may be watched by the operator, and when necessary may be quickly and thoroughly rodded. This opening affords means for raking out and dropping into the forehearth any chilled accretions that may form. It is provided with a heavy metal door which may be of any convenient size, and is preferably in the form of a ..e, so that it may be rolled to one side for the purpose of opening.

By reason of the use of the open overflow-spout 25, the level of the bath in the converter is limited, and the forehearth affords a free discharge for the slag and shells, and prevents any trapping of the blast, such as prevails in ordinary blast furnace practice, and it also prevents the accumulation of a body of floating slag which always exists in any form of apparatus in which the blast is trapped.

29 represents a congealed slag covering which forms over the forehearth and constitutes a practically air-tight union at 30 with the metal drop-tube 26. When the operation of the converter is started and when sufficient matte and slag have accumulated to fill the forehearth to the top level, a clay plug or dam is preferably placed in the slag-discharge 31 of the forehearth, and after the chilled covering 29 has been thus formed, this clay dam is removed and the overflowing slag then finds a ready outlet to the slag pot 32 or other receptacle in which it is received.

The forehearth is preferably very large, say 20 feet in diameter if circular, or 8 to 10 feet wide by 20 feet in length if rectangular in form. It provides a long travel for the slag and matte in molten condition and for the floating liquated ore through the forehearth and underneath the congealed slag covering, in order thus to secure a further separation of all mineral and matte. This has the effect of conserving the heat to a much greater degree than exists in present practice; it causes an exceptionally clean separation of all matte prills that may be mingled with the slag, and, owing to the intense heat and the consequent fluidity of the slag, a better percentage of separation occurs. By this means the floating lumps of silicious ore are also afforded additional opportunity for sweating or liquation under favorable conditions. When ultimately discharged from the forehearth, both the molten slag and the floating silica lumps are exceptionally clean.

A bridge 33 is preferably placed over the forehearth in order to afford a platform on which the workmen may work. Owing to the differences which characterize my process from those heretofore practiced, this bridge is almost a necessity, because the corrosive nature of the matte in the forehearth is such that it eats away the slag covering and renders it too frail for the workmen with safety to stand upon it, as is the case in ordinary practice.

The converter is provided with twyers 34 fed from a suitable wind-box 35. The converter is also provided with suitable means, shown at 36 and 37 in Fig. 1, for rotating it on the rollers 3, 3. The purpose of rotating it is that in case of accident when it is desired to empty the contents of the converter, this may be done by lifting the telescopic section 21' at the base of the pipe 21 and the telescopic section 10 at the base of the outlet for the gases, and then inverting the converter and discharging its molten contents, thus preventing the same from freezing in the vessel. The molten contents of the forehearth should be tapped out at the same time in such event, since otherwise its contents would also solidify and would have to be dug out before operations could be resumed.

In the use of the apparatus, a bath of molten matte is provided in the vessel as above stated, this matte being preferably of low grade and preferably not exceeding 20 per cent. in values. Such bath is rich in iron, sulfur and other oxidizable elements and compounds, and is necessarily very hot, liquid and corrosive. When this bath has been formed, air is blown into it through the twyers 34, and silicious ore is introduced through the opening 21. This ore will float upon the matte, part of it will be taken up by fluxing with the iron, and the remainder will be cracked by the heat, and will yield up its metal values to the bath. This action is due to the fact that the temperature of the molten bath—the temperature which must always exist in order to keep it molten—is greatly in excess of the fusing point of the sulfur contained in the ore, and is also in excess of the most difficultly fusible sulfid constituent of the ore, and is greater than the fusing point of the arsenids, antimonids, etc. The consequence is that these sulfids, arsenids, etc., which represent the mineral constituents of the ore are freed by fusion from the ore when the silicious shell of the latter is cracked by the heat, and being thus freed they pass into and become a part of the molten bath, while the worthless silicious shells remain unfused and pass off with the slags into the forehearth.

The greater the length of the apparatus, the longer will be the travel of the floating ore immersed in the bath, from the point of entrance at one end to the point of discharge through the overflow-spout at the other end.

Ores as found in nature are quite different physically. Some will yield up their values by liquation more quickly than others. The length of the vessel must be governed by the characteristics of the ores to be treated. The latter should remain in the bath for a long enough period to have their occluded minerals separated from the gangue, so that they will join the molten bath of matte, before the worthless silicious shells are discharged into the forehearth, otherwise a useless waste of values will occur. The difference in characteristics of the ores therefore must regulate their sojourn in the molten bath, and this sojourn can alone be governed by the length of the furnace and the rate of feed. It will be found cheaper in practice to increase the length of the furnace, rather than to reduce its producing capacity by checking the feed. The rate of feed may be regulated as desired. Within certain limits a long travel for the floating ore is desirable, but no good can result from making this travel greater than is found in practice to accomplish a clean separation. The size of the vessel will govern the volume of initial bath; which must cover the converting twyers to start the process. An adequate volume of blast must also be provided.

In the use of the apparatus, the gases in the converter are at a considerable pressure, which is desirable because it helps to maintain the high temperature in the converter necessary for carrying out the process. Because of the pressure of the gases, the several openings of the converter such as the joint at the pipes 10 and 21' and also the molten slag charging opening 24 should be tightly closed.

What I claim is:—

1. The herein described method of treating ores containing natural fuel values, which consists in first subjecting the ores to the hot gases from the furnace or converter to which they are to be fed, to thereby dry and preheat them to a point less than the fusion point of the natural fuel elements contained therein, and then delivering the preheated ores to a molten bath of matte in the converter under the action of a converting blast, whereby the temperature of the bath is maintained by the oxidation of the ores; substantially as described.

2. The herein described method of treating ores containing natural fuel values, which consists in crushing the ores, preheating them to a temperature less than the fusion point of the natural fuel elements contained therein, and then delivering the preheated ores to a molten bath of matte in which the heat is maintained by the oxidation of the ores; substantially as described.

3. The herein described method of treating ores containing natural fuel values, which consists in preheating the ores to a temperature less than the fusion point of the natural fuel elements contained therein, delivering the preheated ores to a molten bath of matte of low grade but rich in oxidizable elements and compounds, and subjecting the same to an oxidizing blast; substantially as described.

In testimony whereof, I have hereunto set my hand.

RALPH BAGGALEY.

Witnesses:
 EDWIN T. JACKMAN.
 WM. A. MORROW.